July 14, 1942.  E. FRIEDLAENDER  2,289,907
VEHICLE BRAKE DIVING CONTROL
Filed May 15, 1941
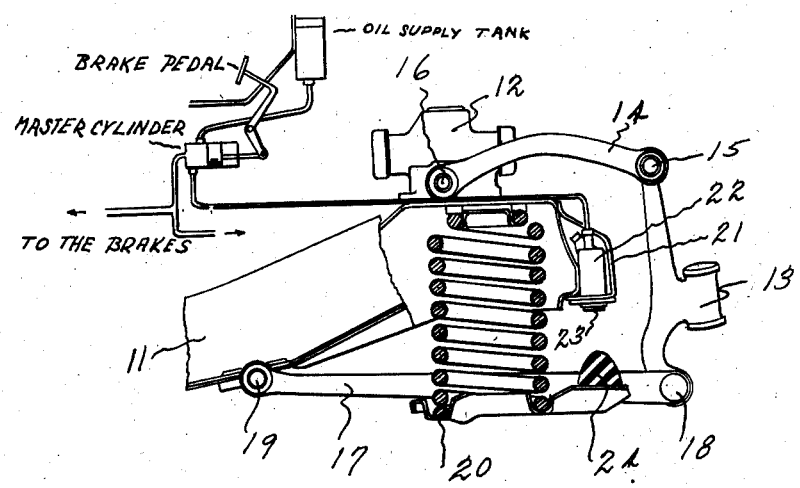
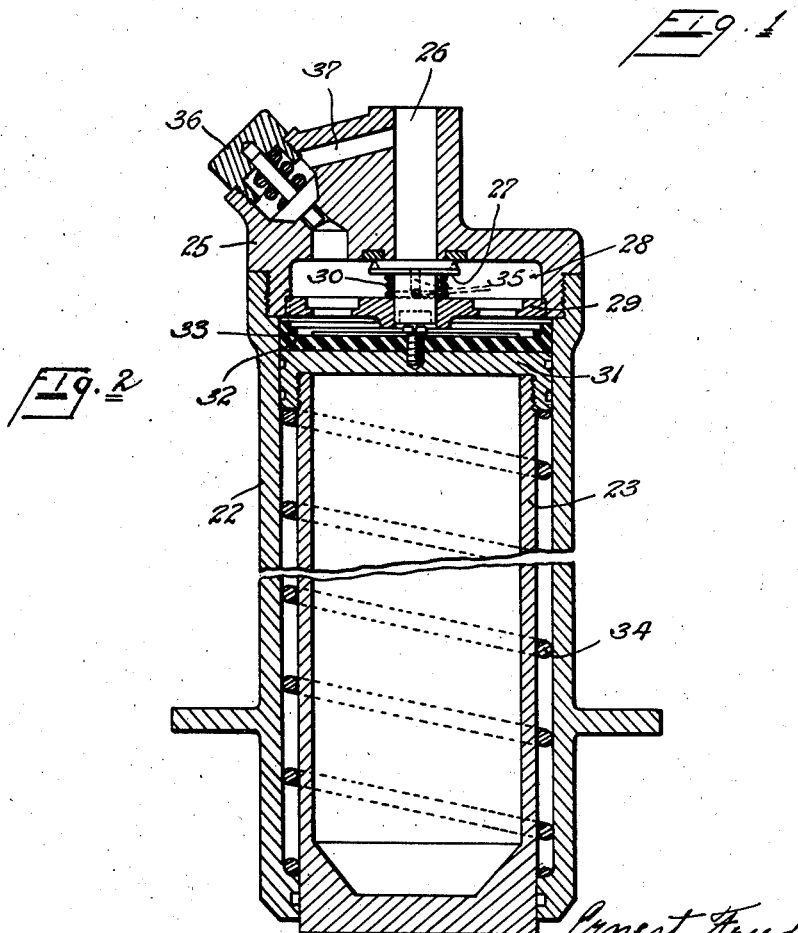
INVENTOR.
Ernest Friedlaender
BY Robert A. Sloman
ATTORNEY Patented July 14, 1942

2,289,907

UNITED STATES PATENT OFFICE 2,289,907

VEHICLE BRAKE DIVING CONTROL

Ernest Friedlaender, Detroit, Mich.

Application May 15, 1941, Serial No. 393,531

17 Claims. (Cl. 188—2)

This invention relates to a mechanism adapted to prevent brake diving of a vehicle during periods of accentuated deceleration. More particularly this invention relates to a novel mechanism which is actuated at the moment that the vehicle brakes are applied for preventing relative vertical movement of the vehicle body with respect to the front wheel assembly during braking periods.

Heretofore there has been a diving action of the vehicle during such periods due to the fact that a resilient spring connection is disposed between the vehicle body and the wheels. This diving action is caused by the momentum of the vehicle and may be eliminated by interposing between the vehicle body and the wheels suitable means for preventing this relative movement.

It is the object of this invention to provide in vehicles a novel hydraulic unit which is operably connected to the hydraulic brake system thereof by suitable conduits whereby said mechanism is automatically actuated at the moment that the vehicle brakes are applied.

It is the further object hereof to provide in combination with a vehicle and interposed between the vehicle body and the wheel movable pneumatic or hydraulic means which will be actuated upon application of the brakes for maintaining a definite spaced relationship between the vehicle body and the wheels throughout periods of accentuated deceleration.

It is the further object of this invention to provide in a mechanism of this type resilient means for automatically returning said movable means to its initial inoperative position.

It is the still further object of this invention to provide fluid connection to a cylinder or piston for actuating one with respect to the other for operative engagement with the lower link of a front wheel suspension to prevent or decrease relative movement between the vehicle frame to which said mechanism is secured and the wheels during braking periods.

It is the still further object of this invention to provide a valve mechanism to permit the introduction of fluid or gas under pressure for actuating either cylinder or piston for operative engagement within the wheel suspension as and when desired.

It is the still further object of this invention to provide means within said valve for permitting the gradual escape of fluid after the brakes have been applied, it being desirable that said piston or cylinder be returned to its initial inoperative position.

It is the further object of this invention to provide a safety valve within said mechanism adapted to cut out or reduce the diving control means when exceptionally heavy obstructions are encountered on the highway.

It is the further object of this invention to provide in a mechanism of this type telescoping means interposed between the upper and lower link of the now popular double link suspension system or more generally between the frame and the axle on the conventional type of suspension. Said means are adapted to cooperate with suitable hydraulic means secured to the vehicle frame for hydraulically controlling and preventing diving of the vehicle throughout braking periods.

It is the still further object herein to provide a device for eliminating brake diving wherein forces are applied to the upper link or lower link of a vehicle wheel suspension for controlling the spring deflection.

It is the still further object of this invention to provide that said mechanism of the telescopic type be in constant connection with said suspension whereby gradual and smooth forces may be applied as and when desired for preventing brake diving.

It is the still further object herein to provide a positive force which is hydraulically or pneumatically actuated for slightly elevating the vehicle body with respect to the wheel suspension throughout periods of accentuated deceleration.

This invention relates to the various arrangements of elements and parts and the combinations thereof as hereinafter described in connection with the following specification and drawings, of which:

Figure 1 is a fragmentary elevational view of a vehicle wheel suspension illustrating an example of mounting the brake diving control.

Figure 2 is a sectioned elevational view of the hydraulic actuating means thereof.

Figure 3 is a fragmentary partially sectioned view of a different embodiment of the brake diving control mechanism.

Figure 4 is an elevational view of the type of wheel suspension with which my invention is adapted to be used.

The above drawing illustrates merely preferable embodiments of this invention, it being expressly understood that the invention is not limited thereby.

In the drawing the double link suspension system as the most popular today has been chosen for demonstrating the working of the invention.

The vehicle frame member is indicated as 11 having a suitable shock-absorber 12. A steering knuckle support 13 for a vehicle wheel has disposed at one end and pivotally connected thereto the upper support link 14 pivoted at 15 with the other end of said link connected to the actuating spindle 16 of the aforementioned shock-absorber. A lower support link 17 is pivotally secured at the other end of said steering knuckle support 13 at point 18, with the other end of said lower link pivotally joined to the vehicle frame member 11 at point 19 for completing the wheel suspension linkage.

A suitable coil spring 20 is interposed between the frame cross member 11 and the lower supporting link 17 with the respective ends of said spring suitably seated and secured to the respective elements which they engage. Thus it is seen that a resilient suspension or connection is provisioned between the vehicle body and the vehicle wheel whereby under ordinary conditions and throughout periods of accentuated deceleration it will be seen that diving of the vehicle will occur.

It being desirable to prevent this brake diving throughout such periods, a novel mechanism is secured to said cross frame member 11 with a suitable control therefore whereby throughout braking periods relative movement between the vehicle body and the wheels may be prevented, reduced or opposed.

Secured to the vehicle frame 11 and forming a part thereof is provisioned a bracket 21 within which is vertically disposed and secured thereto a cylinder member 22, the interior of which is joined to the vehicle brake mechanism for operation in the manner hereinafter described in detail.

A longitudinally reciprocable piston 23 is provisioned within said cylinder and is adapted for reciprocable motion with respect thereto for engagement on the outer end thereof, when actuated, with a suitable rubber or elastic cushion or bumper 24.

Referring to Figure 2, the upper portion 25 forming a cover member for cylinder 22 has a central opening 26 for providing fluid communication with the fluid braking system of the vehicle. A main valve member 27 is normally seated over opening 26 for closing off chamber 28 therefrom.

A perforated plate 29 is secured within chamber 28 in spaced relation to valve member 27 with a suitable resilient means such as a spring 30 interposed therebetween whereby said valve is automatically closed when fluid pressure is cut off in conduit 26.

A cover member 31 is suitably secured to the top of the hollow piston 23 providing a closure therefore within cylinder 22. A sealing diaphragm or other suitable means 32 is provisioned adjacent to and cooperatively engaging member 31 and also the interior walls of cylinder 22 for providing a hermetical seal within said cylinder.

A resilient expander ring 33 is disposed within said sealing member for maintaining the peripheral walls thereof in sealing engagement with the interior wall of the cylinder at all times.

A coil spring 34 is longitudinally disposed around piston 23 within cylinder 22 adapted to resiliently engage the cover member 31 of said piston for returning said piston to its normal position when the fluid pressure is relieved from the top thereof, and forcing the fluid within cylinder 22 back into conduit 26 through opening 35 in valve 27.

In operation when the vehicle brakes are applied it is seen that fluid under pressure is conducted from the hydraulic vehicle brake system to conduit 26 whence by virtue of the braking pressure the main valve 27 is unseated and fluid is forced into chamber 28. This fluid under pressure flows through the perforated disc member 29 and exerts an expansive force upon the cover member 31 of the movable piston 23. Consequently upon actuating the vehicle brakes piston 23 will also be actuated, and as seen in Figure 1, will be caused to descend vertically or at a suitable angle with its outer end forcefully engaging the top of the elastic cushioning member 24. As long as the fluid pressure remains, or on the other hand as long as the vehicle brakes are applied there is a continuous fluid pressure into conduit 26 for maintaining piston 23 against the top surface of the cushion 24, preventing compression of spring 20. It will be noted in this connection that spring 34 is weaker than the brake shoe springs with the result that the actuating device will operate before the brakes take full effect.

Valve 27 has centrally disposed therein a relatively small opening 35 in communication with chamber 28. It will be seen that when fluid pressure is relieved from conduit 26 that said valve 27 by action of the spring 30 will automatically recede whereby a quantity of fluid is confined between the cover 31 of piston 23 and said valve, i. e. within chamber 28.

By virtue of the resilient action of spring 34 operating upon the cover member 31 piston 23 will be gradually returned to its initial position with the fluid above mentioned being permitted to escape gradually through the opening 35 in valve 27 whence it may be returned to the vehicle hydraulic braking system. Consequently piston 23 is returned to its initial inoperative position where it is ready for instant actuation whenever the brakes are again applied.

It will be understood that the present invention is preferably adapted for hydraulic operation in connection with a vehicle braking system. It is understood on the other hand, however, that said device may be operated independently thereof.

Furthermore said invention might possibly be operated pneumatically such as by air or other gases under pressure.

In the present invention it is seen that the piston 23 is adapted for longitudinal movement with respect to cylinder 22. It is understood, however, that the invention also includes a mechanism wherein the cylinder is movable with respect to a stationary piston.

As hereinabove described it is seen that the cylinder 22 and piston 23 are supported by the frame member 11 and that piston 23 is adapted for intermittent cooperative engagement with the cushion member 24 disposed upon the lower link 17 of the wheel suspension. It is understood the invention also includes a mechanism whereby one or both of the aforementioned relatively movable members is secured to the lower link.

A safety valve 36 is provisioned within member 25 which forms a cover to cylinder 22. A conduit 37 is interposed between said safety valve and the fluid conduit 26; and also a conduit is provisioned within cover member 25 for connecting the interior of chamber 28 with the safety valve 36.

By the provisioning of said safety valve a fluid by-pass is provided permitting the escape of fluid from chamber 28 at the moment just after the brakes are applied. For instance, when there are substantial irregularities in the pavement requiring braking action or slowing down of the vehicle it is desirable that resiliency be maintained between the vehicle frame member 11 and the vehicle wheel suspension.

Consequently by the provision of the safety valve 36 the effect of the piston 23 is substantially eliminated by permitting the piston to return when it is desired to maintain a resilient relationship between the vehicle frame and wheel suspension. It is understood that safety valve 36 is opened by virtue of the additional pressure applied to the fluid through piston 23 at the moment that the vehicle wheel engages a substantial irregularity in the pavement.

Figure 3 illustrates a slightly different embodiment of the invention wherein the upper link 14 is provided with a cantilever member 38 adjacent the shock absorber actuating spindle 16.

Brake diving occurs when the vehicle body 11 tends to drop vertically with respect to the front wheel assembly. This is equivalent to a counterclockwise rotational movement of the wheel assembly including link 14 with respect to the body.

The embodiment in Figure 3 is adapted to oppose this movement by providing a contrary force adapted to act in a clockwise direction with respect to the cantilever 38.

A suitable cylinder housing 39 is secured to the shock absorber 12, having disposed therein a longitudinally movable hollow piston 40. A chamber 41 is provisioned between the cylinder 39 and a piston 40, with a suitable sealing diaphragm 42 secured to the top of piston 40 by means of a screw 43 and washer 44.

An expander ring 45 is annularly disposed within said sealing member, for maintaining the peripheral walls thereof in continued sealing engagement with the interior wall of the cylinder 39.

Fluid under pressure from the vehicle braking system, or from an exterior source is conducted to cylinder 39 through conduit 46 whence it unseats valve 47, which is maintained normally closed by the spring 48. Thereby fluid under pressure is conducted to chamber 41 for causing longitudinal movement of piston 40.

A secondary piston 49 is disposed within the hollow piston 40 with a coil spring 50 interposed therebetween forming a resilient support therefor guaranteeing a smooth and gradual motion of piston 49 whenever piston 40 is actuated.

A finger or actuating pin 51 is centrally supported upon a suitable elastic cushion 52 and secured within the secondary piston 49, as shown in Figure 3. The outer end 53 of said pin is spherical in shape for cooperative engagement with the concaved end member 54 of the cantilever 38.

In operation member 54 moves slightly transversely of member 53 and by providing a point contact therebetween friction is minimized to reduce wear of the respective elements.

The embodiment above described in connection with Figure 3 is a power actuated device for preventing or limiting or reducing brake diving throughout periods of accentuated deceleration. This is accomplished by applying a force upon the end of the cantilever 38 which acts against forces tending to produce relative movement of the vehicle body with respect to the front wheel assembly.

It will be noted that the adjustment of the embodiment of Figure 3 may be such that a positive lifting force is applied to the vehicle body for raising the front part of the body slightly if desired.

Valve 47 is provided with a relatively small opening 55 for permitting the escape of fluid from chamber 41 when the brakes are no longer applied, thus permitting piston 40 to return to its inoperative position.

It is understood that the springs within the cylinders should preferably be weaker than the brake shoe springs, so that the actuating device may operate before the brakes take effect.

Furthermore by virtue of the embodiment of Figure 3 a constant connection is maintained between the actuating device and the wheel suspension guaranteeing the smooth application of force in the prevention or reduction of brake diving.

In the description above there was only mention of preventing brake diving by interposing a force between the vehicle frame and the front wheels of a car. It will be understood that the same or similar result could be obtained by interposing a force between the frame and the rear wheels. In this case, however, the object would be to prevent the frame from lifting (instead of diving) and consequently the application of the forces provided by the invention would have to be in an opposite direction.

It will be noted that a combination of a front and rear application of the invention is also possible for achieving the objects above set forth. The number of units used may therefore vary as also the direction of the operating forces.

Having described my invention reference should be had to the claims which follow for determining the scope thereof.

I claim:

1. In a vehicle having a frame, a wheel assembly, a resilient suspension of the swinging support arm type between said frame and said assembly having pivoted upper and lower links, and also having a fluid braking system; movable means operated by said braking system for interposing a force tending to lift the frame for controlling vertical movement of said frame during braking periods.

2. In a vehicle having a frame, a wheel assembly, a resilient suspension between said frame and assembly, and also having a fluid braking system; a cylinder in communication with said braking system, a reciprocable piston within said cylinder adapted to forcefully engage said suspension during braking periods, resilient means interposed between said cylinder and piston for returning the latter when the brakes are released, and a resiliently seated valve between said piston and said braking system, said valve having a relatively small opening therein for permitting the escape of fluid from said cylinder after the brakes are released.

3. In a vehicle having a frame, a wheel assembly, a resilient suspension between said frame and assembly, and also having a braking system; a cylinder and a cover member supported by said frame communicating with a fluid pressure source, a reciprocable piston within said cylinder adapted to forcefully engage said suspension when said pressure source is released, and a by-pass safety valve in said cover for permitting the escape of fluid under pressure from said cylinder at certain predetermined pressures.

4. The combination, a vehicle frame, a wheel assembly, a resilient suspension between said frame and said assembly consisting of an upper link and a lower link pivoted to said frame and to said wheel assembly, a cylinder communicating with a fluid braking system, a reciprocable piston within said cylinder adapted to forcefully engage said lower link when the brakes are applied for controlling brake driving of said frame, said lower link having thereon an elastic cushion for resiliently receiving said piston.

5. In a vehicle frame suspension having pivoted upper and lower links for supporting a wheel assembly, and having a fluid braking system; a cylinder and a piston relatively movable with respect to each other and joined to said braking system for interposing a force tending to lift the frame, for controlling pivotal movement of said upper link with respect to said frame thereby maintaining a spaced relation between said assembly and frame during braking periods.

6. In a vehicle frame suspension having pivoted upper and lower links, for supporting a wheel assembly, and having a fluid braking system; a cylinder communicating with said braking system, a reciprocable piston within said cylinder adapted to forcefully actuate said upper link for controlling pivotal movement thereof with respect to said frame during braking periods, for controlling brake diving of said frame.

7. In a vehicle frame suspension having pivoted upper and lower links for supporting a wheel assembly with a cantilever on the end of said upper link, and having a fluid braking system; a cylinder communicating with said braking system, a reciprocable piston within said cylinder adapted to forcefully engage the end of said cantilever, for controlling pivotal movement thereof with respect to said frame during braking periods, consequently controlling brake diving of said frame.

8. In a vehicle frame suspension having pivoted upper and lower links for supporting a wheel assembly, with a cantilever on the end of said upper link, and having a fluid braking system; a cylinder communicating with said braking system, a hollow reciprocable piston within said cylinder, a secondary reciprocable piston within said piston, resilient means interposed between said piston and said secondary piston, said secondary piston being adapted to forcefully engage the end of said cantilever during braking periods for controlling brake diving.

9. In a vehicle frame suspension having pivoted upper and lower links for supporting a wheel assembly, with a cantilever on the end of said upper link, and having a fluid braking system; a cylinder communicating with said braking system, a hollow reciprocable piston within said cylinder, a secondary reciprocable piston within said piston, resilient means interposed between said piston and said secondary piston, a stem longitudinally disposed and secured within said secondary piston and extending beyond the end thereof to continuously and resiliently engage the end of said cantilever, whereby on application of the brakes said stem is resiliently and forcefully projected for limiting pivotal action of said upper link for controlling brake diving of said frame.

10. In a vehicle frame suspension having pivoted upper and lower links for supporting a wheel assembly, with a cantilever on the end of said upper link, and having a fluid braking system; a cylinder communicating with said braking system, a hollow reciprocable piston within said cylinder, a secondary reciprocable piston within said piston, resilient means interposed between said piston and said secondary piston, a stem longitudinally disposed and resiliently secured within said secondary piston and extending beyond the end thereof to continuously and resiliently engage the end of said cantilever, whereby on application of the brakes said stem is resiliently and forcefully projected for limiting pivotal action of said upper link, and a resiliently closed valve interposed between said cylinder and said fluid braking system.

11. In a vehicle frame suspension having pivoted upper and lower links for supporting a wheel assembly and having a pressure source, with a cantilever on the end of said upper link; a cylinder communicating with said pressure source, a hollow reciprocable piston within said cylinder, a secondary reciprocable piston within said piston, resilient means interposed between said piston and said secondary piston, a stem longitudinally disposed and resiliently secured within said secondary piston and extending beyond the end thereof to continuously and resiliently engage the end of said cantilever, whereby when said pressure source is released upon application of the brakes said stem is resiliently and forcefully projected for controlling pivotal movement of said links.

12. In a vehicle having a frame, a wheel assembly, a resilient suspension between said frame and assembly, and also having a fluid braking system; a cylinder communicating with said braking system, a reciprocable piston within said cylinder adapted to cooperatively engage said suspension during braking periods, and a resiliently seated valve within said cylinder interconnecting said piston with said braking system.

13. In a vehicle having a frame, a wheel assembly, a resilient suspension between said frame and assembly, and also having a fluid braking system; a cylinder communicating with said braking system, a reciprocable piston within said cylinder adapted to cooperatively engage said suspension during braking periods, and a resiliently seated valve interconnecting said piston with said braking system, said valve having a relatively small opening for permitting the escape of fluid from said cylinder after the brakes are applied.

14. In a vehicle having a frame, a wheel assembly, a resilient suspension between said frame and assembly consisting of an upper link and a lower link pivoted to said frame and to said wheel assembly, and a fluid braking system; a cylinder communicating with said braking system, and a reciprocable piston within said cylinder adapted to forcefully engage said suspension during braking periods for controlling brake diving of said frame.

15. In a vehicle having a frame, a wheel assembly, a resilient suspension between said frame and assembly consisting of an upper link and a lower link pivoted to said frame and to said wheel assembly, and a fluid braking system; a cylinder communicating with said braking system, a reciprocable piston within said cylinder adapted to forcefully engage said suspension during braking periods for controlling brake diving of said frame, and a by-pass safety valve in said cylinder for permitting escape of fluid under pressure from said cylinder at certain predetermined pressures.

16. In a vehicle frame suspension having pivoted upper and lower links for supporting a wheel assembly with a cantilever on the end of said upper link, and having a fluid braking system; a cylinder communicating with said braking system, a reciprocable piston within said cylinder adapted to forcefully engage the end of said cantilever, and resilient means interposed between said piston and the end of said cantilever for controlling pivotal movement thereof with respect to said frame during braking periods, consequently controlling brake diving of said frame.

17. The combination, a vehicle frame, a wheel assembly, a resilient suspension between said frame and said assembly consisting of an upper link and a lower link pivoted to said frame and to said wheel assembly, a braking system, and a fluid pressure source; a cylinder communicating with said pressure source, and a reciprocable piston within said cylinder adapted to forcefully engage said lower link when said fluid pressure source is released upon application of the brakes, for controlling brake diving of said frame.

ERNEST FRIEDLAENDER.

Patent No. 2,289,907. July 14, 1942.
ERNEST FRIEDLAENDER.

It is hereby certified that error appears in the printed specification of the above numbered patent requiring correction as follows: In the heading to the drawing, line 3, to the extreme right of the filing date, insert "2 Sheets-Sheet 1"; and insert Sheet 2 containing Figures 3 and 4, as shown below, as a part of the patent -

July 14, 1942.     E. FRIEDLAENDER     2,289,907
VEHICLE BRAKE DIVING CONTROL
Filed May 15, 1941     2 Sheets-Sheet 2

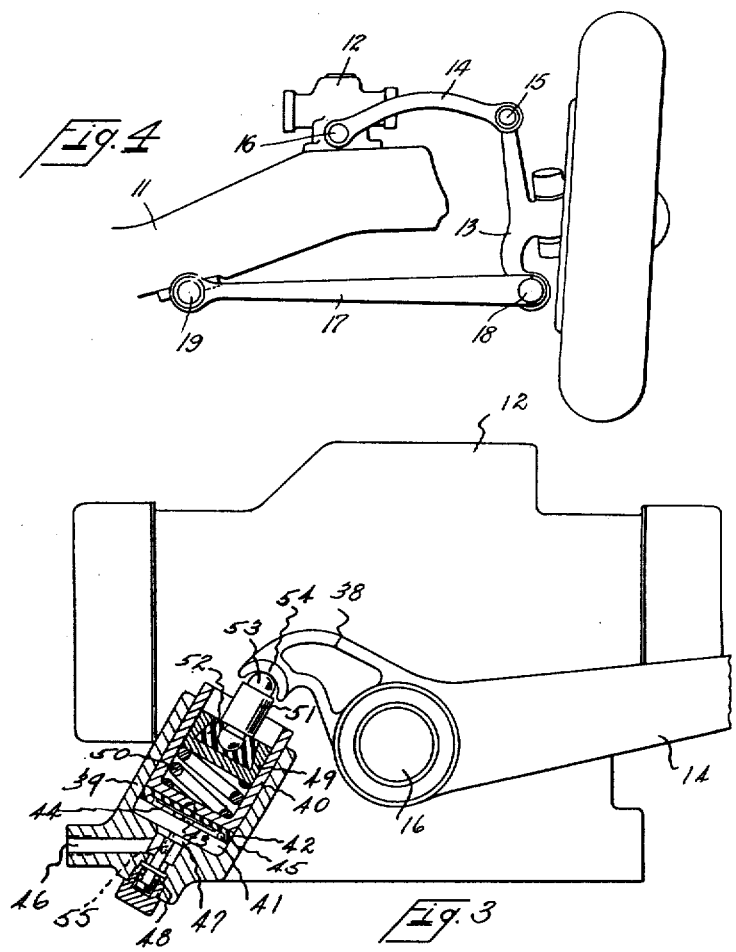

INVENTOR
Ernest Friedlaender
BY
Robert A. Sloman
ATTORNEY and that the said Letters Patent should be read with this correction therein that the same may conform to the record of the case in the Patent Office.

Signed and sealed this 17th day of November, A. D. 1942.